Sept. 28, 1943.　　　T. W. PAUL　　　2,330,734
SLIP CLUTCH
Filed Dec. 31, 1941
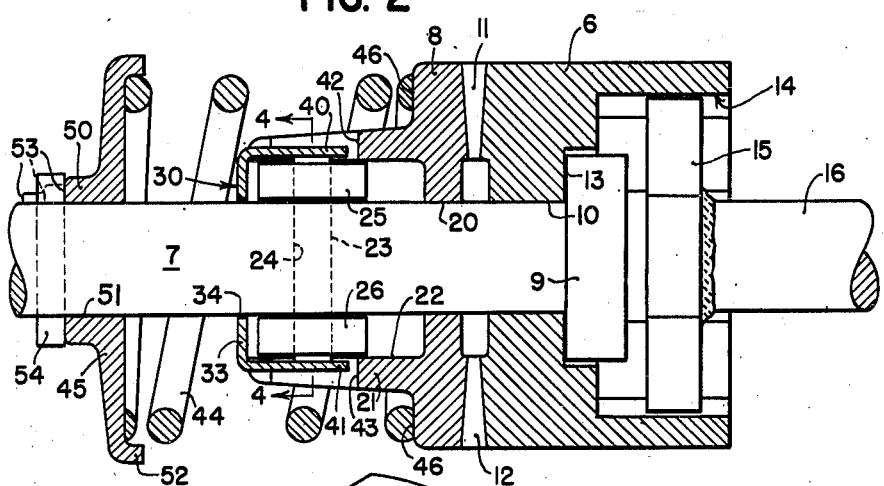
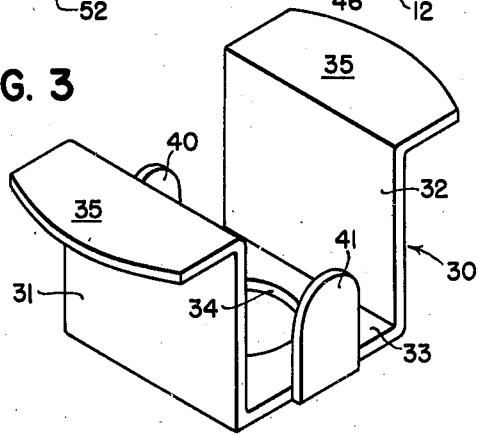
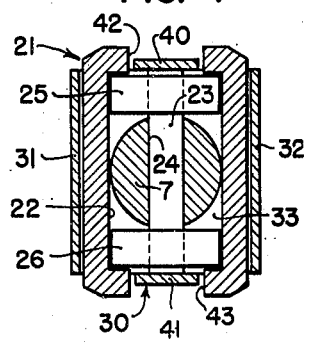
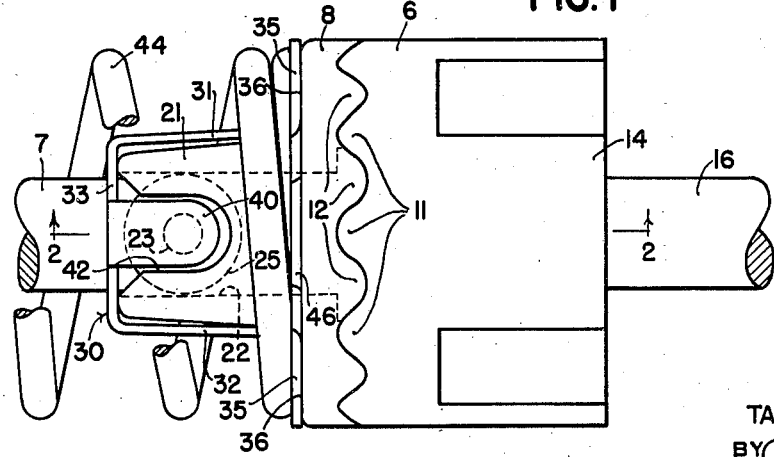
INVENTOR
TALBERT W. PAUL
BY
ATTORNEY Patented Sept. 28, 1943

2,330,734

UNITED STATES PATENT OFFICE 2,330,734

SLIP CLUTCH

Talbert W. Paul, Moline, Ill., assignor to Deere & Company, Moline, Ill., a corporation of Illinois Application December 31, 1941, Serial No. 425,085

3 Claims. (Cl. 64—29)

The present invention relates to slip clutches, and has as its principal object the provision of an improved clutch so constructed and arranged that the declutching action is extremely sensitive and accurate in operation. A further object is to provide a clutch that is sturdy and long lived, and one that is, at the same time, inexpensive to manufacture.

These objects are accomplished by providing rollers between the movable clutch member and its associated drive member which substantially eliminate sliding friction therebetween as the said clutch member moves axially away from and out of engagement with its companionate clutch member when the clutch is overloaded.

Other objects and advantageous features of my invention will become apparent to those skilled in the art after consideration of the following detailed description of the preferred embodiment thereof, reference being had to the accompanying drawing, in which Figure 1 is a top plan view of a slip clutch embodying the principles of this invention;

Figure 2 is a cross sectional view of the same, taken along the line 2—2 of Figure 1;

Figure 3 is an enlarged isometric perspective view of the retainer for holding the pin and rollers in place; and Figure 4 is a cross sectional view, taken along the line 4—4 in Figure 2.

Referring now to the drawing, the slip clutch illustrated comprises a driving clutch member 6, a driven member in the form of a shaft 7, and an intermediate clutch member 8, which is movable axially along the shaft 7 into and out of engagement with the driving member 6. The shaft 7 has an annular shoulder or flange 9 formed at one end thereof, and the other end is connected with operating mechanism (not shown) in any convenient manner for driving the same.

The driving member 6 is journaled on the shaft 7 and is preferably in the form of a cylindrical casting having a central aperture 10 to receive the shaft. One end of the driving member 6 is provided with a plurality of axially extending clutch teeth 11 which cooperate with companionate clutch teeth 12 on the adjacent end of the intermediate member 8 to provide a releasable driving connection therebetween. The other end of the member 6 is recessed at 13 to receive the shoulder 9 which thus serves as an end thrust bearing, and is further provided with an axially extending socket portion 14 which is shaped to receive an X-shaped driving knuckle 15 welded to the end of a drive shaft 16. This construction provides a limited amount of flexibility between the shaft 16 and driving member 6, and also permits the latter to be removed readily from the shaft.

The intermediate member 8 is likewise apertured centrally at 20 to receive the shaft 7 and is slidable axially thereon. An axially extending hub 21 of generally rectangular cross section is formed on the side of the intermediate member 8 opposite the clutch teeth 12, and is provided with a rectangular aperture 22 in the end thereof. A pin 23 extends through a hole 24 in the shaft 7 within the length of the aperture 22, and projects radially from opposite sides of the shaft, said pin being parallel to the long sides of the aperture. A pair of rollers 25 and 26 are journaled on the projecting ends of the pin 23 and have rolling contact on their peripheral edges with the sides of the aperture 22.

The pin 23 and rollers 25, 26 are held in place on the shaft 7 by means of a retainer 30 which is preferably made of heavy gauge sheet metal bent into the general shape of a U and having legs 31, 32, and a bight portion 33. The bight portion 33 is apertured centrally at 34 to receive the shaft 7, and the legs 31, 32 are bent outwardly at 35 to bear on an annular shoulder 36 formed on the member 8 immediately behind the clutch teeth 12. Ears 40 and 41 are provided at opposite sides of the bight portion 33 and extend axially therefrom to cover the ends of the pin 23, the short sides of the rectangular hub 21 being slotted back from the end thereof at 42 and 43 to receive the ears 40, 41, respectively. The slots 42, 43 and the slidable retainer 30 are for the purpose of facilitating assembly of the clutch, and permit the insertion of the pin 23 through the rollers 25, 26 and through the hole 24 in the shaft 7 when the intermediate clutch member 8 is mounted on the shaft.

The movable clutch member 8 is yieldingly urged into engagement with the driving member 6 by a spring 44 which embraces the member 8 and bears at one end against a tension-adjusting spring retainer 45 and at the other end against the base portions 35 of the retainer 30. The ends of the spring are squared and ground flat, and the shoulder 36 of the clutch member 8 is provided with raised pads 46 of the same thickness as the bases 35 and midway between them to provide a substantially flat plane of contact between the spring and clutch member. The spring retainer 45 is preferably in the form of a disk having a hub 50 that is apertured to receive the shaft 7. A low annular flange 52 extends axially from the periphery of the disk 45 over the end of the spring to center the same with respect to the shaft. The end of the hub 50 opposite the spring is provided with a plurality of axially spaced steps 53 which are adapted to engage a pin 54 extending through the shaft 7 to locate and hold the retainer in axially adjusted position for the purpose of regulating the pressure of the spring. By thus regulating the pressure of the spring 44, the clutch can be adjusted to release at any one of several overloads, the number of adjustments being limited to the number of steps 53 that can be provided on the end of the hub 50.

The operation of the invention is as follows:

Under normal driving conditions, power is transmitted from the driving member 6 to the intermediate member 8 through the clutch teeth 11, 12, and from the intermediate member 8 to the driven shaft 7 through the rollers 25, 26, and pin 23. When the clutch is overloaded, however, the teeth 11, 12 cooperate to cam the movable member 8 away from and out of driving engagement with the member 6 against the pressure of the spring 44. Axial movement of the member 8 relative to the shaft 7 is accommodated by the rollers 25, 26 which roll on the sides of the aperture 22 in the hub 21. Since the axis of rotation of the rollers is perpendicular to and intersects the axis of the shaft 7, it follows that the rollers track parallel to the axis of the shaft and therefore have a true rolling contact with the sides of the aperture 22. Inasmuch as the driving connection between members 7 and 8 is solely through rollers which offer only rolling resistance to relative movement therebetween, the element of sliding frictional resistance, which increases greatly as the pressure increases and which is present in all splined or squared-shaft clutch constructions, is eliminated and the releasing action of the clutch is affected solely by the pressure of the spring 44 which remains substantially constant under all driving conditions for any given adjustment of the retainer 45.

What I claim as my invention, therefore, and desire to secure by Letters Patent is:

1. A slip clutch comprising a shaft, a pair of clutch members journaled thereon, one of said clutch members being movable axially along said shaft away from the other member to disengage the clutch under an overload, a pin fixed to and extending radially from said shaft on opposite sides thereof, a pair of rollers journaled on the ends of said pin, said movable clutch member having an aperture formed therein to receive said rollers, said aperture being elongated axially to permit axial movement of the clutch member with respect to the rollers, said rollers engaging the sides of said aperture at points spaced radially from the axis of the shaft and tracking substantially parallel to the axis, a retainer slidably embracing said shaft and having a pair of ears at opposite sides thereof extending axially over the ends of said pin for holding the pin and rollers in place, and a spring bearing against said retainer for holding the same tightly against said movable clutch member and for yieldingly urging the latter into engagement with said other clutch member.

2. A clutch comprising a pair of interengageable rotatable clutch members, one of said members being shiftable axially to engage and disengage the other, a power transmitting member associated with said shiftable clutch member, a driving connection between the last two mentioned members including a roller disposed for rotation about an axis radial to the axis of rotation of said clutch members and engaging said associated members to transmit torque therebetween during rotation, a compression spring acting between said associated members to urge said shiftable clutch member into engagement with the other clutch member, and a retainer for securing said roller in position, said retainer having a portion on which said spring bears to secure said retainer in place.

3. A clutch comprising a pair of interengageable rotatable clutch members, a shaft on which one of said members is slidable axially into and out of engagement with the other of said members, a driving connection between said shiftable member and said shaft including a roller disposed for rotation about an axis radial to the axis of rotation of said clutch, axially extending track means on said shiftable clutch member adapted to receive said roller to transmit torque between said shaft and shiftable clutch member, a compression spring encircling said shaft and anchored thereto, said spring bearing against said shiftable clutch member to hold the latter in clutching engagement, and a sheet metal retainer having a portion lying against said roller to retain the latter in engagement with said track means and a flange portion secured between said spring and said clutch member at their point of bearing.

TALBERT W. PAUL.